United States Patent
Chen et al.

(10) Patent No.: US 8,699,551 B2
(45) Date of Patent: Apr. 15, 2014

(54) SYSTEM FOR FEXT CANCELLATION OF MULTI-CHANNEL TRANSCEIVERS WITH PRECODING

(75) Inventors: Jie Chen, San Jose, CA (US); Keshab K. Parhi, Maple Grove, MN (US)

(73) Assignee: Leanics Corporation, Maple Grove, MN (US)

( * ) Notice: Subject to any disclaimer, the term of this patent is extended or adjusted under 35 U.S.C. 154(b) by 152 days.

(21) Appl. No.: 12/806,556

(22) Filed: Aug. 16, 2010

(65) Prior Publication Data

US 2011/0261865 A1    Oct. 27, 2011

Related U.S. Application Data

(60) Provisional application No. 61/274,903, filed on Aug. 24, 2009.

(51) Int. Cl.
*H04L 5/16* (2006.01)

(52) U.S. Cl.
USPC ............ 375/222; 375/227; 375/224

(58) Field of Classification Search
USPC ................................ 375/219–222
See application file for complete search history.

(56) References Cited

U.S. PATENT DOCUMENTS

2007/0014378 A1* 1/2007 Parhi et al. .................. 375/267
2008/0285573 A1* 11/2008 Diab et al. .................. 370/401

* cited by examiner

*Primary Examiner* — Sam K Ahn
*Assistant Examiner* — Janice Tieu (57) ABSTRACT

The present invention relates to data processing techniques in multi-channel data transmission systems. In this invention, a novel approach is proposed to deal with FEXT interferences in the application of high/ultra-high speed Ethernet systems. Compared with the traditional FEXT cancellation approaches, the proposed FEXT canceller can deal with the non-causal part of FEXT, and thus can achieve better cancellation performance. Instead of using the conventional DFE, structure, TH precoding technique is incorporated into the proposed design to alleviate the error propagation problem. The resulting FEXT cancellers do not contain feedback loops which makes the high speed VLSI implementation easy. A modified design is also developed by using a finite signal as the input to the FEXT canceller such that the hardware complexity of the proposed FEXT canceller can be reduced.

29 Claims, 10 Drawing Sheets

| CAT-6 UTP Cable | Average DP-SNR (dB) | | | | | | | |
|---|---|---|---|---|---|---|---|---|
| | Straightforward design (Fig. 3) | | Feedforward FEXT canceller (Fig. 5) | | Proposed design I (Fig. 8) | | Proposed design II (Fig. 9) | |
| | (a) | (b) | (a) | (b) | (a) | (b) | (a) | (b) |
| Measured 100m | 25.55 | 19.53 | 30.74 | 21.52 | 30.75 | 30.36 | 30.75 | 28.65 |
| Measured 75m | 27.80 | 24.74 | 37.05 | 31.03 | 37.06 | 36.89 | 37.06 | 35.30 |
| Measured 55m | 28.87 | 27.51 | 41.37 | 34.34 | 41.38 | 41.23 | 41.38 | 38.78 |

| CAT-6 UTP Cable | Average DP-SNR (dB) | | | | | | | |
|---|---|---|---|---|---|---|---|---|
| | Straightforward design (Fig. 3) | | Feedforward FEXT canceller (Fig. 5) | | Proposed design I (Fig. 8) | | Proposed design II (Fig. 9) | |
| | (a) | (b) | (a) | (b) | (a) | (b) | (a) | (b) |
| Measured 100m | 25.55 | 19.53 | 30.74 | 21.52 | 30.75 | 30.36 | 30.75 | 28.65 |
| Measured 75m | 27.80 | 24.74 | 37.05 | 31.03 | 37.06 | 36.89 | 37.06 | 35.30 |
| Measured 55m | 28.87 | 27.51 | 41.37 | 34.34 | 41.38 | 41.23 | 41.38 | 38.78 |

PRIOR ART

Fig. 3

PRIOR ART

PRIOR ART

(a) A TH precoder (b) Equivalent Form of a TH Precoder

Fig. 6

PRIOR ART (a) Decision Feedback Equalizer (b) TH precoding for DFE

Fig. 7

PRIOR ART

SYSTEM FOR FEXT CANCELLATION OF MULTI-CHANNEL TRANSCEIVERS WITH PRECODING

CROSS-REFERENCE TO RELATED APPLICATIONS

This application claims the benefit of U.S. Provisional Application No. 61/274,903, filed on Aug. 24, 2009, the entire content of which is incorporated herein by reference in its entirety.

FIELD OF THE INVENTION

The present invention relates to data processing and transmission in wire-line communication systems. More specifically, it relates to non-causal far-end crosstalk cancellation in multi-channel transceivers.

BACKGROUND OF THE INVENTION

Data transmission through wire-line multiple channels usually suffers from crosstalk interferences, such as echo, near-end crosstalk (NEXT), and far-end crosstalk (FEXT). Generally, FEXT is much smaller than echo and NEXT, and it can be tolerated. However, for high/ultra-high speed applications, such as 10 Gigabit Ethernet over copper (10GBASE-T), far-end crosstalk (FEXT) becomes one of the major impairments, which limit the quality and capacity of data transmission over unshielded twisted-pair (UTP) cable channels. To meet the desired throughput (10 Gbps) and target BER ($10^{-12}$) requirements, novel FEXT cancellation schemes are needed in a multi-channel transceiver design.

Conventional technology that addresses FEXT interference is mainly based on the concept of noise cancellation. The FEXT canceller is employed at the receiver side to suppress FEXT interference. Due to the fact that the disturbing source of FEXT is generally unknown to the victims, it is difficult to apply an accurate input to the FEXT canceller at the receiver side. One prior technique made use of the tentative decision of the disturbing far-end transmit signal as the input to the FEXT canceller, and both the FEXT canceller and linear equalizer were jointly adapted to combat intersymbol interference (ISI) and FEXT (See, e.g., Gi-Hong Im, Kyu-Min Kang and Cheol-Jin Park, "FEXT Cancellation for Twisted-Pair Transmission," *IEEE J. Select. Areas Commun.*, vol. 20, no. 5, pp. 959-972, June 2002). However, the particular drawback of this technique is that the tentative decisions are only estimates of disturbing far-end transmit symbols, and incorrect tentative decisions occur in practice, which thereby increases the error rates. Instead of using the tentative decisions, another technique applied the actual decisions of the far-end transmit symbols to the input of the FEXT canceller, and a structure based on multi-input multi-output (MIMO) decision feedback was proposed to remove the FEXT crosstalk in digital subscriber line (DSL) systems (See, e.g., G. Ginis and J. Cioffi, "vectored transmission for digital subscriber line systems," *IEEE J. Select. Areas Commun.*, vol. 20, no. 5, pp. 1085-1104, June 2002). However, nonlinear feedback loops inside of this structure limit its use for high speed applications, and also the error propagation problem inherent in DFE structure remains unsolved. In real applications, it is found that FEXT exhibits non-causal characteristic which makes FEXT cancellation more difficult. In addition, the strength of FEXT varies significantly with different cables and connectors. For example, the effect of FEXT is dominant when cable length is between 20 and 50 meters. It is important to satisfy the performance of these transceivers at all lengths. In other words, a flexible solution needs to be developed to work under different cabling environments.

What is needed is a new design methodology and an implementation method for efficiently dealing with FEXT crosstalk that can overcome the limitation of the traditional schemes, achieve a better cancellation performance, and also be suitable for high speed VLSI implementation.

BRIEF SUMMARY OF THE INVENTION

The present invention describes a new FEXT cancellation approach which can significantly improve the cancellation performance in terms of decision-point SNR (DP-SNR) over the existing technology, and also provides a high-speed implementation method for the proposed feedforward delayed FEXT canceller with Tomlinson-Harashima precoding (THP).

In accordance with the present invention, FEXT is treated as noise, and a new feedforward FEXT canceller with THP is designed to remove FEXT interference at the receiver side. In the proposed design, the received signal corrupted by the FEXT interference at the victim channel is delayed till the FEXT cancellation signal from disturbing channel is available, such that the non-causal part of FEXT can be cancelled. Instead of using the conventional DFE structure, a new equalization structure is applied with four separate TH precoders at the transmitter side and four corresponding feedforward equalizers at the receiver side. Based on this structure, the error propagation problem can be alleviated, thus the reliability of the tentative decision can be improved. In addition, by eliminating the feedback loops, the resulting feedforward FEXT canceller can be easily pipelined to be suitable for high speed applications. Furthermore, a modified design is also developed by using a finite signal as the input to the FEXT canceller such that the hardware complexity of the proposed FEXT canceller can be reduced.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. The accompanying figure, which are incorporated herein, form part of the specification, illustrate the present invention and, together with the description, further serve to explain the principles of the invention and to enable a person skilled in the relevant art to make and use the invention.

DETAILED DESCRIPTION OF THE INVENTION

Background on Conventional FEXT Cancellation

Figure 2:
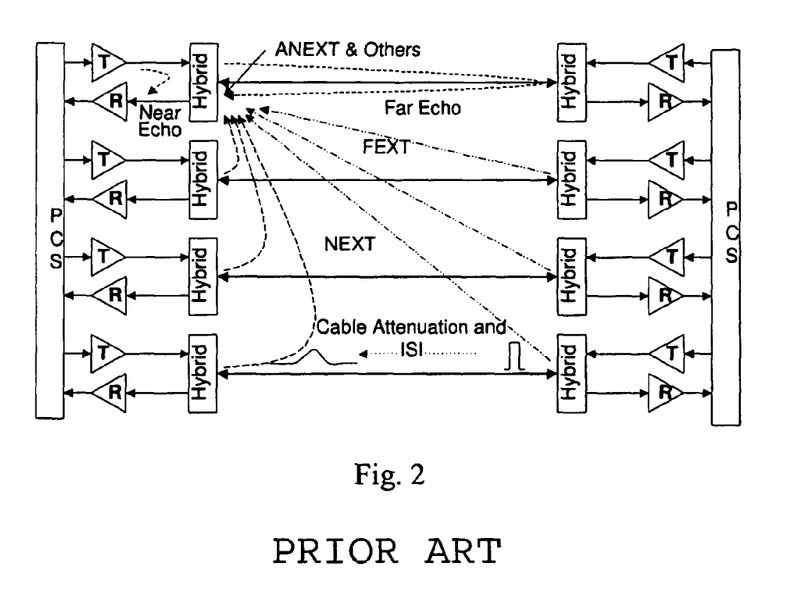
FIG. 2 illustrates the data transmission over a typical channel model of 4 pairs of UTP in a 10GBASE-T system.

Consider signal transmission path over a typical multiple channel environment shown in FIG. 2, FEXT interferences are generated by disturbing signals from adjacent transmitters at the far end of the transmission link, and pass through the victim channel, i.e., the first channel in FIG. 2. In order to suppress FEXT interferences, FEXT cancellers are introduced for the victim channel at the near end receiver. According to existing technology, the inputs to these FEXT cancellers can be obtained from the tentative decisions of the disturbing signals from the adjacent receivers. The outputs of the FEXT cancellers are then subtracted from the received signal for the victim channel, thus cancelling the FEXT interferences.

Figure 3:
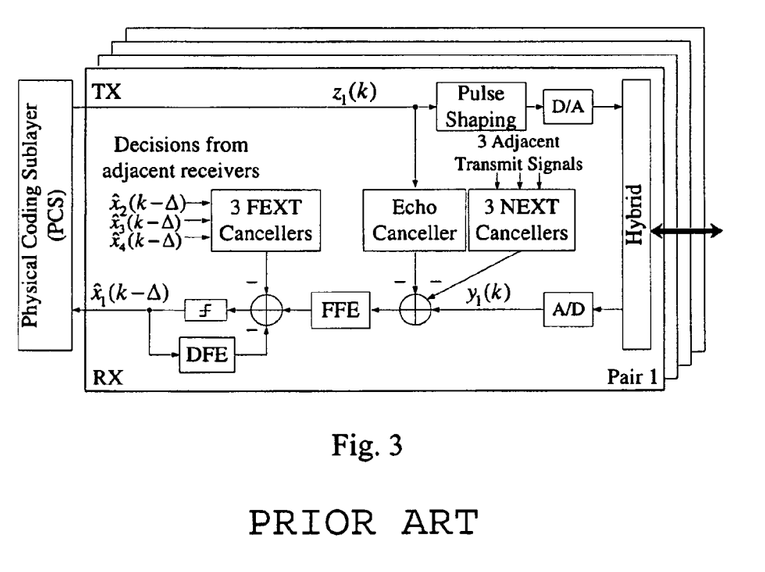
FIG. 3 illustrates the block diagram of a straightforward design of the FEXT cancellers in a typical Ethernet transceiver for one pair.

Based on this idea, FIG. 3 shows a straightforward design of the FEXT cancellers in a typical ethernet transceiver for one pair, and similar structures are applied to the other three pairs. In this figure, the local transmitted signal $z_1(k)$ goes through a shaping filter, a digital to analog (D/A) converter, hybrid circuitry, and finally is coupled to the UTP cable for transmission. On the receiving path, the received signal is first sampled to get $y_1(k)$, and then the outputs of the echo and NEXT cancellers are subtracted from $y_1(k)$ to remove the echo and NEXT interferences. After that, a DFE structure, containing a feed-forward equalizer (FFE) and a feedback equalizer (FBE), is used to perform channel equalization. Assume the decision delay is $\Delta$. Then the estimates of the far end transmitted signals $\hat{x}_i(k-\Delta)$ are fed to the FEXT cancellers for proper FEXT cancellation. Note that all the filters in the figure are adapted to the varying channel environment and the coefficients of these filters can be obtained during an initial training period.

However the main problem associated with the design in FIG. 3 is the insufficient FEXT cancellation. Notice that the inputs to the FEXT cancellers are from the decisions of the disturbing signals with a certain decision delay $\Delta$. It is impossible to generate a FEXT cancellation signal until the decision of the disturbing signal is available. Thus, if FEXT occurs at the output of the FFE filter before the decision of the disturbing signal is made, then part of the FEXT will not be cancelled. In practice, this does happen because of two reasons. Firstly, the FFE is only designed for mitigating the pre-cursor ISI for each pair. However, the pre-cursor FEXT will not be mitigated accordingly. Secondly, FEXT exhibits non-causal characteristics, which means FEXT can arrive at the near end receiver before its disturbing source arrives. In this invention we define the non-causal part of the FEXT as the FEXT components that arrive at the output of the FFE before the decisions of the disturbing signals are made. For a practical channel environment, this can be illustrated in FIG. 4. In this figure, it shows that the decision delay is 420. In other words, after the decision delay of 420 samples, the decision at the slicer will be available to generate a FEXT cancellation signal. However, it can be seen that part of FEXT already occurs at the output of the FFE filter before the decision delay. Thus, failure to account for this non-causal part of the FEXT will lead to insufficient FEXT cancellation, even though all previous decisions are correct.

Delayed Feedforward FEXT Canceller

Figure 4:
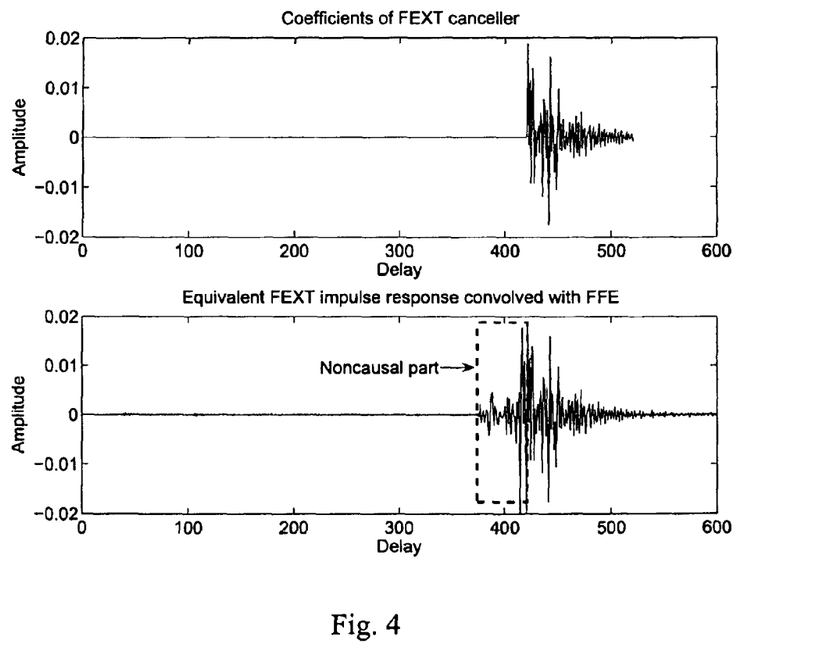
FIG. 4 gives an example of insufficient FEXT cancellation due to non-causal part of FEXT.

Consider FIG. 4, if the received signal corrupted by the FEXT interference at the victim channel can be delayed till the FEXT cancellation signal from disturbing channel is available, then non-causal FEXT can be removed.

Figure 5:
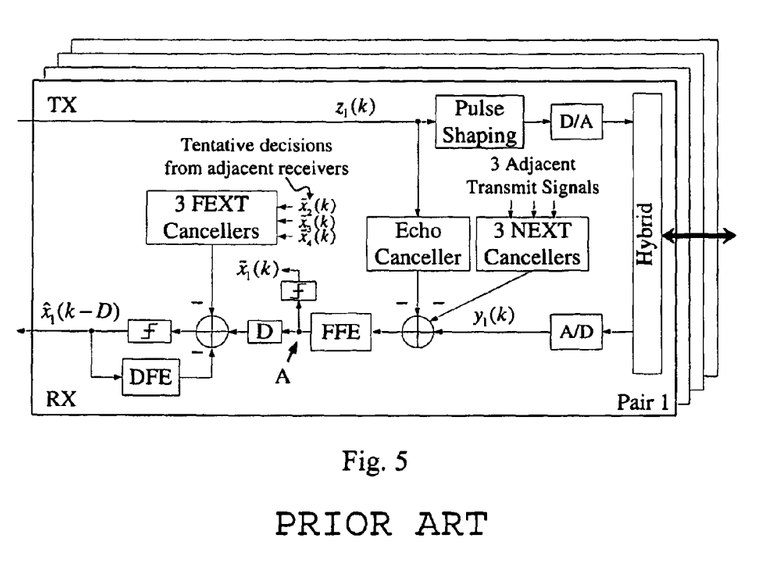
FIG. 5 illustrates the block diagram of delayed feedforward FEXT cancellation based on DFE structure.

FIG. 5 shows the modified design by inserting a bulk delay D at output of the FFE. From this figure, it is seen that three FEXT cancellers are needed for each of four channels (or four pairs). Since there are four pairs of cables in 10GBASE-T, a total of 12 FEXT cancellers are needed for FEXT cancellation. The inputs to these FEXT cancellers are called tentative decisions, which are described as coarse estimates of the disturbing signals and can be obtained by slicing the outputs of the FFE from adjacent receivers. For example, tentative decision $\tilde{x}_1(k)$ at victim pair 1 is obtained by slicing the output at point A. Initially, the cancellers and equalizers are not well trained such that the tentative decisions are mostly wrong and can not be used as the inputs to the FEXT cancellers. Therefore, an initial training stage is needed to get the reliable tentative decisions.

It should be noted that the bulk delay D is determined by the duration of the non-causal FEXT part as shown in FIG. 4. By adjusting the bulk delay D, we can decide how much non-causal FEXT can be cancelled. Generally, applying larger bulk delay and longer FEXT cancellers would lead to better FEXT cancellation performance.

Consider the point A in the design as shown in FIG. 5, it should be noted that the signal at point A continues to suffer from FEXT crosstalk, post-cursor ISI and other background noise assuming the echo and NEXT crosstalks and pre-cursor ISI are removed perfectly. Hence, incorrect tentative decisions, i.e., $\tilde{x}_i(k) \neq x_i(k)$, will occur to generate wrong FEXT cancellation signals, which may lead to wrong final decision of far end transmitted signal, i.e., $\hat{x}_i(k-D)$. As we can see, the signal will be fed back to decide the next decision through a DFE structure. Therefore, the error propagation problem will result in an increase of error rates. To solve this problem, a new FEXT canceller is developed for a TH precoder based transceiver.

FEXT Cancellation Combined with TH Precoding

Figure 6:
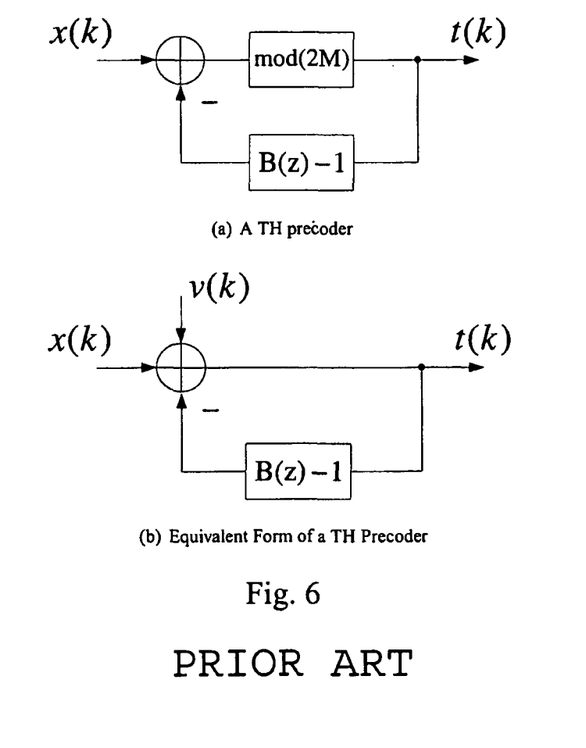
FIG. 6 illustrates Tomlinson-Harashima precoder and its equivalent form.
Figure 7:
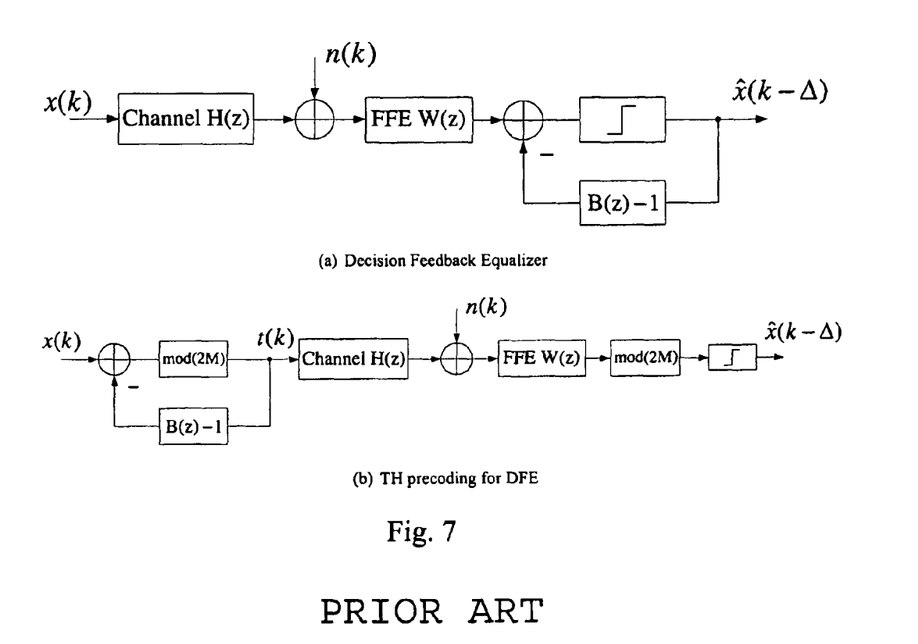
FIG. 7 illustrates the block diagram of a typical application of TH precoder, which is converted from a traditional DFE structure.

To describe the proposed FEXT canceller, the TH precoder is briefly introduced. The TH precoder was first proposed by Tomlinson and Harashima in 1971 (See, M. Tomlinson, "New automatic equalizer employing modulo arithmetic," *Electron. Lett.*, vol. 7, pp. 138-139, March 1971; and H. Harashima and H. Miyakawa, "Matched-transmission technique for channels with intersymbol interference," *IEEE Trans. Commun.*, vol. 20, pp. 774-780, August 1972). It has similar structure as a traditional DFE, except that the decision device in the DFE is replaced with a modulo device in the TH precoder as shown in FIG. 6(a). The operation of TH precoding can be interpreted by using the equivalent form of the TH precoder as shown in FIG. 6(b). A unique compensation signal v(k), which is a multiple of 2M, is added to the transmitted M-PAM signal x(k) such that the output of the precoder t(k) lies in the interval [−M, M). If the input of the TH precoder, x(k), is i.i.d, it can be shown that t(k) has uniform distribution over [−M, M). The effective transmitted data sequence in Z-domain is given by $$T(z) = \frac{X(z) + V(z)}{B(z)} = \frac{D(z)}{B(Z)}, \quad \text{EQ. (1)}$$

where B(z) is a causal FIR filter in the TH precoder feedback path. From (1), it is seen that a TH precoder can be viewed as an IIR filter with the input equal to the sum of the original TH precoder and a finite level compensation signal, i.e., x(k)+v(k). The transmitted signal x(k) can be recovered from the output of the FFE by performing a modulo operation as shown in FIG. 7(b).

Applying the TH precoding technique to the design in FIG. 5 would be straightforward if there is no FEXT cancellation. However, it should be noted that the disturbing signal of the FEXT is now affected by $t_i(k)$ rather than $x_i(k)$ due to the TH precoding. In general, the output of the TH precoder $t_i(k)$ is continuous in the interval $[-M, M]$. In other words, the number of different outputs of the modulo device in the TH precoder is infinite, which makes it difficult to determine the tentative decision of the disturbing signal, $\tilde{t}_i(k)$. Thus, a design of the FEXT canceller in a TH precoding system becomes difficult.

Figure 8:
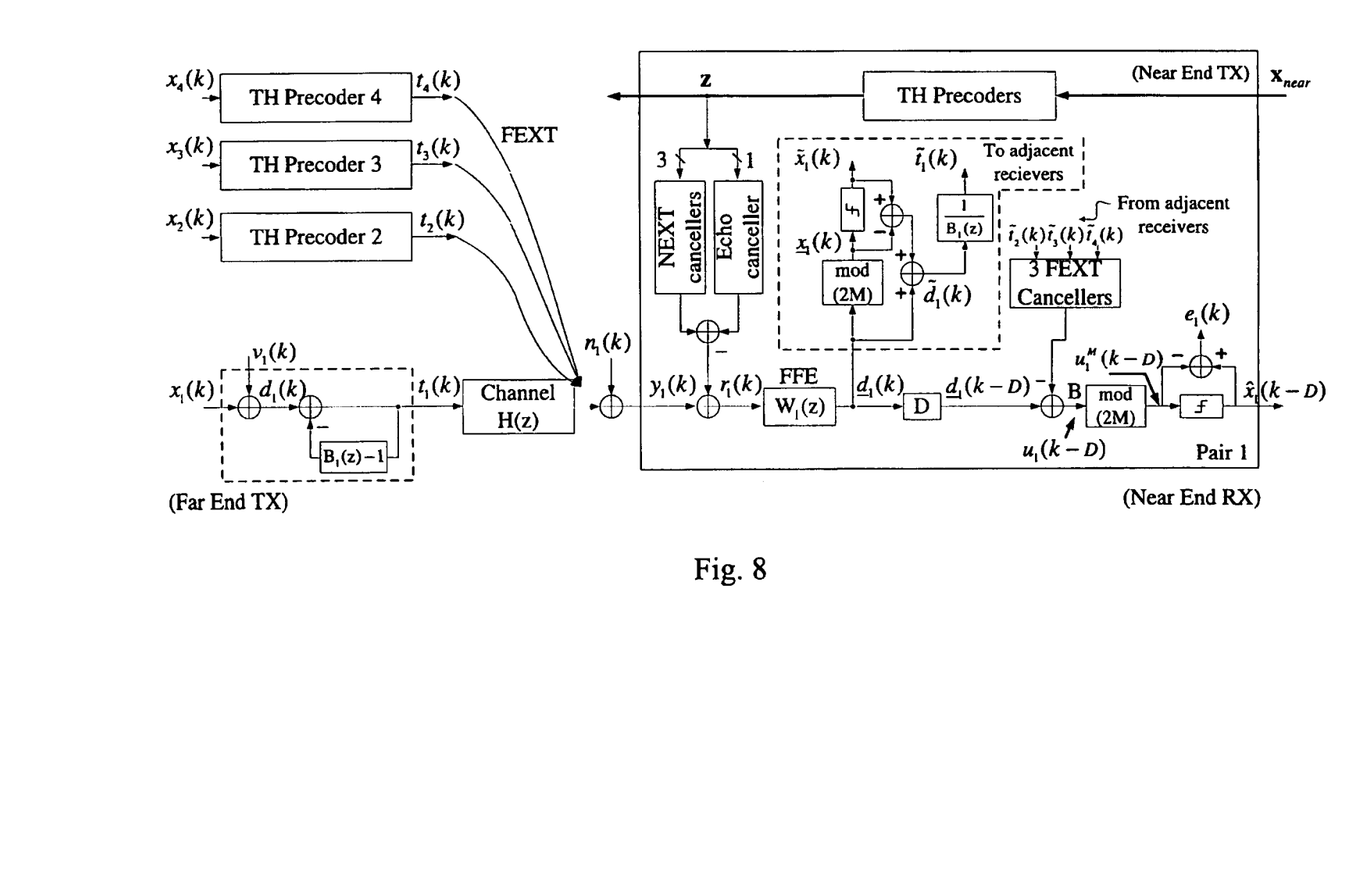
FIG. 8 illustrates the block diagram of the proposed FEXT cancellation in a TH precoding system.

Instead of determining $\tilde{t}_i(k)$ directly, a tentative decision of the sum signal $x_i(k)+v_i(k)$ is first made, and then $\tilde{t}_i(k)$ can be obtained using equation (1). FIG. 8 shows the block diagram of the proposed FEXT cancellation in a TH precoding system. At the far end transmitter, the transmitted signals $x_i(k)_{i=1,2,3,4}$ are first pre-equalized by four corresponding TH precoders. The outputs of the TH precoders $t_i(k)_{i=1,2,3,4}$ are transmitted to the channel. At the near end receiver, pair 1 is taken as an example to illustrate the structure of the receiver, and the other three pairs will have similar architectures. In this figure, the received noisy signal $y_1(k)$ contains FEXT interferences, echo and NEXT interferences (which are not shown in the figure), and additive white noise $n_1(k)$. First, echo and NEXT cancellation is performed to obtain the signal $r_1(k)$. After that, signal $r_1(k)$ is fed to the FFE to remove the pre-cursor ISI. Ideally, if channel equalization is perfect, the output of the FFE, $d_1(k)$, will only contain $x_1(k)+v_1(k)+n_1(k)$, as well as FEXT interferences. A tentative decision $\tilde{d}_1(k)$ is then obtained by slicing $d_1(k)$. To avoid using a complex multi-level slicer, an alternate implementation is shown in FIG. 8. Since the FEXT interference is small, the reliable tentative decision $\tilde{d}_1(k)$ can be achieved. According to (1), an estimate of the effective transmitted signal, $\tilde{t}_1(k)$ can be obtained by inserting an IIR filter $1/B_1(z)$ after $\tilde{d}_1(k)$ as shown in FIG. 8. Similarly, $\tilde{t}_i(k)_{i=2,3,4}$ can be obtained from adjacent receivers, and then can be used as the inputs to the FEXT cancellers. The final estimate of the transmitted symbol is denoted as $\hat{x}_1(k)$ with a delay D, which is inserted at the output of the FFE.

The performance of the proposed FEXT canceller can be evaluated in terms of average decision-point SNR (DP-SNR) over multiple pairs. In this invention, the theoretical average DP-SNR is derived based on the proposed design in FIG. 8. From this figure, the ith effective transmitted signal $t_i(k)$ can be expressed as:

$$t_i(k) = d_i(k) - \sum_{l=1}^{N_b} b_i(l) t_i(k-l), \qquad \text{EQ. (2)}$$

i.e., $$d_i(k) = t_i(k) + \sum_{l=1}^{N_b} b_i(l) t_i(k-l), \qquad \text{EQ. (3)}$$

where $d_i(k)$ is defined as $d_i(k)=x_i(k)+v_i(k)$. $b_i(k)$, $k=0, \ldots, N_b$ is the coefficient of the ith TH precoder with $b_i(0)=1$, and $N_b$ is the order of the TH precoder. If we define the coefficient vector as $\bar{b}_i \triangleq [b_i(1), \ldots, b_i(N_b)]^H$, equation (3) can be written as:

$$d_i(k)=t_i(k)+\bar{b}_i^H \bar{t}_i(k-1), \qquad \text{EQ. (4)}$$

where the superscript H denotes Hermitian transposition, and $\bar{t}_i(k)$ is an $N_b \times 1$ symbol vector, i.e., $$\bar{t}_i(k-1)=[t_i(k-1),t_i(k-2), \ldots, t_i(k-N_b)]^H.$$

A typical transmission channel is shown in FIG. 2, and it can be modeled as two equivalent 4×4 MIMO channels. One is $h_{i,j}$ which denotes the discrete-time channel impulse response from the ith transmitter (at far end) to the jth receiver (at near end) with length $N_1+1$, and the other is $g_{m,n}$ which denotes the echo and NEXT discrete-time channel impulse response from the mth transmitter (at near end) to the nth receiver (at near end) with length $N_2+1$. The received signal at jth channel is given by $$y_j(k) = \sum_{i=1}^{4} h_{i,j}^H t_i(k) + \sum_{m=1}^{4} g_{m,j}^H z_m(k) + n_j(k), \qquad \text{EQ. (5)}$$

for $j=1, \ldots, 4$. $n_j(k)$ denotes the additive white Gaussian noise (AWGN) at jth channel. $t_i(k)$ is a $(N_1+1)\times 1$ far end transmitted symbol vector, and $z_m(k)$ is a $(N_2+1)\times 1$ near end transmitted symbol vector, i.e., $$t_i(k)=[t_i(k),t_i(k-1), \ldots, t_i(k-N_1)]^H,$$

$$z_m(k)=[z_m(k),z_m(k-1), \ldots, z_m(k-N_2)]^H.$$

After echo and NEXT cancellation, the residual signal $r_j(k)$ can be expressed as $$r_j(k) = \sum_{i=1}^{4} h_{i,j}^H t_i(k) + \sum_{m=1}^{4} (g_{m,j} - g_{m,j}^c)^H z_m(k) + n_j(k) \qquad \text{EQ. (6)}$$

$$= \sum_{i=1}^{4} h_{i,j}^H t_i(k) + \sum_{m=1}^{4} (g_{m,j}^{res})^H z_m(k) + n_j(k),$$

where $$g_{m,j}^c = \begin{cases} [0_{1\times\delta}, \bar{g}_{m,j}^{ec}, 0_{1\times(N_2+1-\delta-N_{ec})}]^H, & m = j \\ [0_{1\times\delta}, \bar{g}_{m,j}^{nx}, 0_{1\times(N_2+1-\delta-N_{nx})}]^H, & m \neq j. \end{cases}$$

Here, $\bar{g}_{m,j}^{ec}$ denotes the echo canceller with length $N_{ec}$, and $\bar{g}_{m,j}^{nx}$ denotes the NEXT canceller with length $N_{nx}$. $\delta$ is the delay inserted in the echo and NEXT cancellers to indicate the start position of cancellation. Further processing of the residual signal $r_j(k)$ includes the feedforward equalization and FEXT cancellation. The signal prior to the modulo device at channel 1 (i.e., point B) is $$u_1(k-D) = w_1^H r_1(k-D) - \sum_{m=2}^{4} f_{m,1}^H \tilde{t}_m(k), \qquad \text{EQ. (7)}$$

where $w_j$ denotes the feedforward equalizer with length L at jth channel, and $f_{m,j}$ denotes the FEXT cancellers with length $N_{fx}$. $r_j(k)$ is a L×1 symbol vector, and $\tilde{t}_m(k)$ is a $N_{fx}\times 1$ symbol vector, i.e., $$r_j(k)=[r_j(k),r_j(k-1), \ldots, r_j(k-L+1)]^H,$$

$$\tilde{t}_m(k)=[\tilde{t}_m(k),\tilde{t}_m(k-1), \ldots, \tilde{t}_m(k-N_{fx}+1)]^H.$$

The decision error at the channel 1 is then given by $$e_1(k) = \hat{x}_1(k-D) - \text{Mod}\{u_1(k-D)\} \quad \text{EQ. (8)}$$
$$= \hat{x}_1(k-D) - (u_1(k-D) - v_1(k-D))$$
$$= \hat{x}_1(k-D) + v_1(k-D) - u_1(k-D).$$

In the following analysis, the estimate of disturbing signal supplied to the FEXT canceller is assumed to be correct, i.e., $\tilde{t}_i(k) = t_i(k)$. In addition, the decision at the output of the decision device is assumed to be correct, i.e., $\hat{x}_i(k) = x_i(k)$. It follows from (7) that (8) can be expressed as $$e_1(k) = d_1(k-D) - w_1^H r_1(k-D) + \sum_{m=2}^{4} f_{m,1}^H t_m(k). \quad \text{EQ. (9)}$$

From (4), equation (9) can be written as $$e_1(k) = t_1(k-D) - W_1^H T_1(k), \quad \text{EQ.(10)}$$

where, $$W_1 = \begin{bmatrix} w_1 \\ \overline{b}_1 \\ f_{2,1} \\ f_{3,1} \\ f_{4,1} \end{bmatrix},$$

$$T_1(k) = \begin{bmatrix} r_1(k-D) \\ -\bar{t}_1(k-D-1) \\ -t_2(k) \\ -t_3(k) \\ -t_4(k) \end{bmatrix}.$$

Applying the orthogonality principle (See, e.g., S. Haykin, Adaptive Filter Theory, 4th Ed, Prentice Hall, 2001.), i.e., $E[T_1(k)e_1(k)^H] = 0$, where $E[\cdot]$ denotes the expectation operator, we can get the optimal filter coefficients $$W_1^{opt}(D) = \Psi_1^{-1} \theta_1 \quad \text{EQ.(11)}$$

where $$\Psi_1 = E[T_1(k)T_1(k)^H]$$
$$= \begin{bmatrix} R_{r_1 r_1} & R_{tr_1} \\ R_{r_1 t} & R_{tt} \end{bmatrix},$$

$$\theta_1 = E[T_1(k)t_1(k-D)^H]$$
$$= \begin{bmatrix} E[r_1 t_1] \\ 0 \end{bmatrix}.$$

Substitute (11) into (10), the minimum mean square error (MMSE) at the receiver 1 is then given by $$J_1(D) = E[e_1(k)e_1(k)^H] \quad \text{EQ. (12)}$$
$$= E[|t_1(k-D)|^2] - \theta_1^H W_1^{opt}(D)$$
$$= E[|t_1(k)|^2] - \theta_1^H W_1^{opt}(D).$$

The MMSEs at the other three receivers can be derived in a similar way, thus the average DP-SNR over four channels is defined as $$SNR_{avg}(D) = 10\log_{10}\left(\frac{E[|t_i(k)|^2]}{\frac{1}{4}\sum_{i=1}^{4} J_i(D)}\right). \quad \text{EQ. (13)}$$

It can be seen that average DP-SNR is a function of D, which is related with the non-causal part of the FEXT.

It should be noted that the coefficients of the TH precoders need to be set the same as the corresponding DFE coefficients, which are obtained during the initial training stage (See, e.g., B. McClellan, "10GBASE-T Programmable THP Proposal," in *IEEE 802.3an Task Force Meetings*, May 2005). During the normal data transmission stage, decision error $e_i(k)$ is used to update the filters corresponding to each pair.

Figure 9:
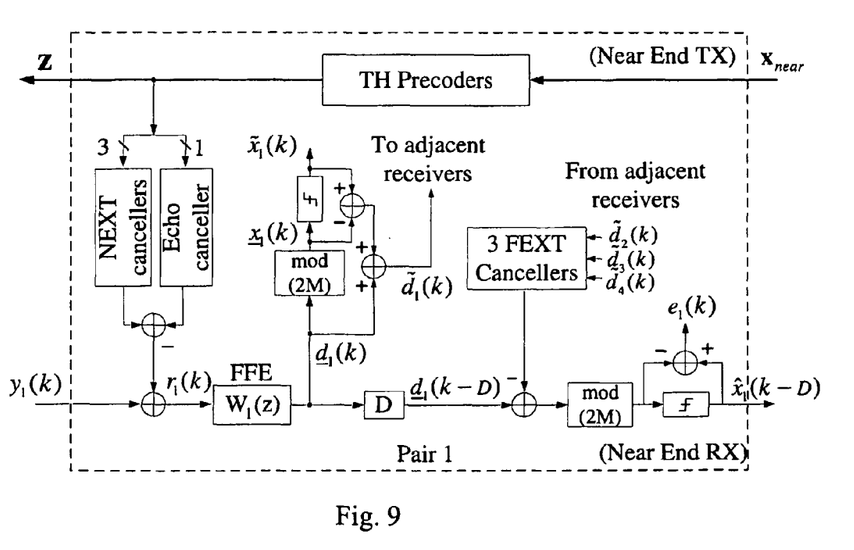
FIG. 9 illustrates the block diagram of a modified FEXT canceller for high speed application.

However, in the application of 10GBASE-T, we may note that feedback loops inside the TH precoders and the part where $\tilde{t}_1(k)$ is generated would be the bottleneck for high speed operation both in transmitter and receiver. To speed up the receiver in the proposed design, we can simply eliminate the IIR filter $1/B_1(z)$ after $\tilde{d}_1(k)$, and directly use $\tilde{d}_1(k)$ as the input to the FEXT canceller. By doing so, each of the resulting FEXT cancellers will implicitly contain an IIR filter. Thus, to achieve good FEXT cancellation performance, the length of the FEXT cancellers needs to be long enough. However, the advantage is that there are no feedback loops in the receiver structure and high speed design is possible. The resulting modified design is shown in FIG. 9, where the inputs to the FEXT cancellers corresponding to pair 1 are changed to $\tilde{d}_i(k)_{i=2,3,4}$ from adjacent receivers.

The modified design can also achieve a low complexity design if we note that $\tilde{d}_i(k)$ has only finite number of values. Thus, those FEXT cancellers with the input $\tilde{d}_i(k)$ can be efficiently implemented by applying techniques such as pre-computation and look-ahead (See, e.g., K. K. Parhi, *VLSI Digital Signal Processing System Design and Implementation*, John Wiley & Son, Inc., New York, 1999). It may be noted that the designs in FIG. 8 and FIG. 9 are only examples of MIMO equalizations for systems using TH precoders. Other embodiments not shown here can be derived by a person skilled in the relevant art by using the main ideas of this invention.

Simulation Results

Figure 10:
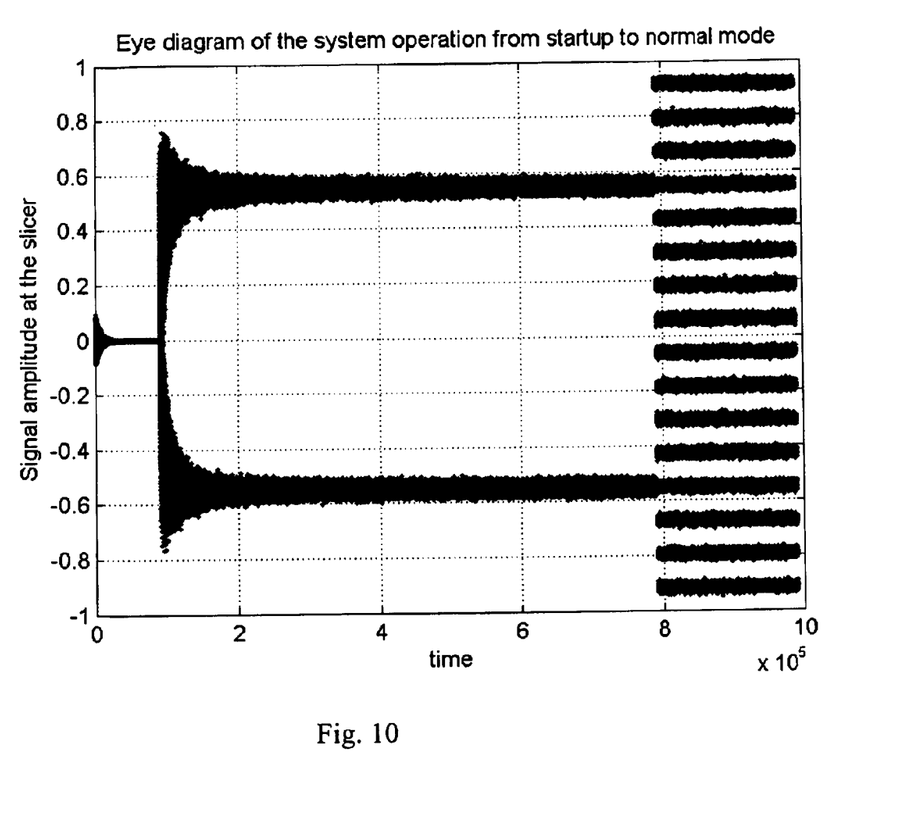
FIG. 10 illustrates a discrete time eye diagram of the system operation from startup to normal mode.

Finally, some simulation results are presented to show the advantage of the proposed design over traditional schemes. FIG. 10 illustrates the system operation from startup to normal data mode. In this figure, the discrete eye diagram is obtained by plotting the symbol values before the decision device and the simulation is performed based on Cat-6 75 m channel model. Notice that the training symbols only have two possible values, i.e., $\{-9, 9\}$, to keep the transmit power in the training mode the same as the transmit power in normal mode.

Figure 1:
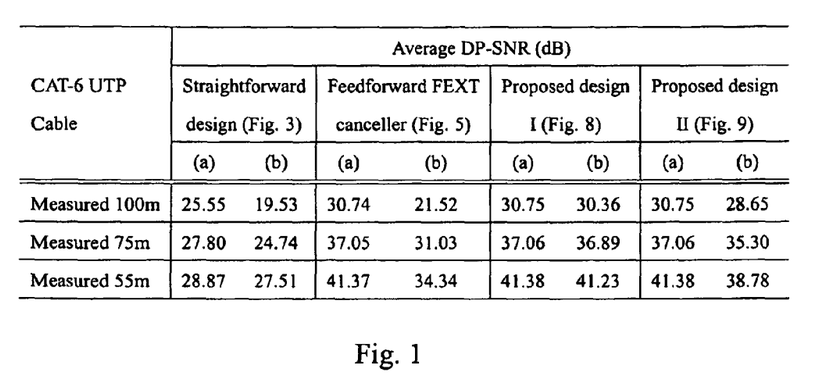
FIG. 1 lists the performance comparison for different designs in terms of average decision-point (DP) SNR during the steady state.

FIG. 1 gives the performance comparison for different designs. In this table, each design is evaluated based on Cat-6 measured channel models with different lengths: 100 m, 75 m, and 55 m respectively. The analytical result (a) is also listed to be compared with the simulation result (b) for each design. As we can see from this table, the straightforward design in FIG. 3 has the worst performance in terms of analytical results and simulation results. Due to the error propagation problem, the simulation results are even worse than the analytical results. Similar observation can be found in the design shown in FIG. 5 except that this design has better performance than the straightforward design. The DP-SNR improvement is mainly because the non-causal FEXT can be properly considered in this design. However, due to the incorrect tentative decisions, the simulation results are still worse than the analytical results as we can see from FIG. 1. Specifically, in terms of the simulation results for 100 m channel model, the first two designs can not meet the minimum DP-SNR requirement, 23.8 dB. However, in the proposed design I (FIG. 8) and II (FIG. 9), the simulation results are 30.36 and 28.65 respectively for the channel model of the same length. Thus, about 6.6 dB and 4.9 dB SNR margin can be achieved. The significant improvement in terms of simulated DP-SNR verifies that the proposed designs can remove the non-causal FEXT effectively; in addition, tentative decisions at the output of the FFE filter are more reliable compared with the design in FIG. 5. It is also found that the SNR margin is larger for shorter channel models. Compared with the proposed design I, the performance degradation in simulation results in proposed design II is due to the fact that an FIR filter is used to approximate an IIR filter in the FEXT canceller.

CONCLUSIONS

A new FEXT cancellation scheme combined with TH precoding technology is proposed, and a new feedforward FEXT canceller with TH precoding is also developed to remove FEXT interferences in multiple channel data transmission systems. Compared with the traditional FEXT cancellation approaches, the proposed FEXT canceller can deal with the non-causal part of FEXT, and thus can achieve much better cancellation performance. In addition, the proposed design is suitable for high-speed VLSI implementation by eliminating the feedback loops in the traditional FEXT cancellers.

It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A far-end cross-talk canceller for a precoded multiple-input multiple-output communications system comprising a plurality of receivers, each receiver comprising:
    a first received signal that is filtered by a first feed-forward equalizer (FFE);
    a first decision device, comprising a first modulo device and a first slicer, to process the output of the first FFE to compute a first tentative decision by adding the output of the first FFE to a first error signal obtained by computing the difference between the input and output of the first slicer of the first decision device;
    a first far-end cross-talk (FEXT) canceller filter to filter a second tentative decision from an adjacent receiver;
    a first summer to subtract the first FEXT canceller filter output from a delayed version of the first FFE output to compute a first FEXT-free signal; and
    a second decision device, comprising a second modulo device and a second slicer, to process the first FEXT-free signal to compute a first output symbol.

2. The far-end cross-talk canceller in claim 1 where the first tentative decision is input to a second far-end cross-talk (FEXT) canceller filter of an adjacent receiver.

3. The far-end cross-talk canceller in claim 1 where the precoder is a Tomlinson-Harashima precoder.

4. The far-end cross-talk canceller in claim 1 where the first slicer is coupled to the output of a first modulo device whose input is coupled to the first FFE output.

5. The far-end cross-talk canceller in claim 1 where the first FFE output is delayed by one sample or a plurality of samples.

6. The far-end cross-talk canceller in claim 1 where the first tentative decision is filtered by a precoder filter first and the filtered output is then input to the second far-end cross-talk canceller of an adjacent receiver.

7. The far-end cross-talk canceller in claim 6 where the precoder filter is an infinite impulse response filter.

8. The far-end cross-talk canceller in claim 1 where the first FEXT canceller filter is a finite impulse response filter.

9. The far-end cross-talk canceller in claim 1 where the second FEXT canceller filter of an adjacent receiver is adapted by a second error signal obtained by computing the difference between the input and output of the second slicer of the second decision device.

10. The far-end cross-talk canceller in claim 1 used in an Ethernet transceiver over copper.

11. The far-end cross-talk canceller in claim 1 used in a 10GBase-T transceiver.

12. The far-end cross-talk canceller in claim 1 used in a wired transceiver.

13. The far-end cross-talk canceller in claim 1 implemented by a circuit.

14. The far-end cross-talk canceller in claim 1 used in a communications transceiver, where the first received signal corresponds to a signal after echo from a corresponding near-end transmitter has been cancelled from its the input signal.

15. The far-end cross-talk canceller in claim 1 used in a communications transceiver, where the first received signal corresponds to a signal after near-end cross-talk from an adjacent transmitter has been cancelled from its input signal.

16. An integrated circuit to implement a far-end cross-talk canceller for a precoded multiple-input multiple-output communications system, comprising a plurality of receivers, each receiver comprising:
    A first feed-forward equalizer (FFE) to filter a first received signal;
    a first decision device, comprising a first modulo device and a first slicer, to process the output of the first FFE to compute a first tentative decision by adding the output of the first FFE to a first error signal obtained by computing the difference between the input and output of the first slicer of the first decision device;
    a first far-end cross-talk (FEXT) canceller filter to filter a second tentative decision from an adjacent receiver;
    a first summer to subtract the first FEXT canceller filter output from a delayed version of the first FFE output to compute a first FEXT-free signal; and
    a second decision device, comprising a second modulo device and a second slicer, to process the first FEXT-free signal to compute a first output symbol.

17. The far-end cross-talk canceller integrated circuit in claim 16 where the first tentative decision is input to a second FEXT canceller filter of an adjacent receiver.

18. The far-end cross-talk canceller integrated circuit in claim 16 where the precoder is a Tomlinson-Harashima precoder.

19. The far-end cross-talk canceller integrated circuit in claim 16 where the first slicer is coupled to the output of a first modulo device whose input is coupled to the first FFE output.

20. The far-end cross-talk canceller integrated circuit in claim 16 where the first FFE output is delayed by one sample or a plurality of samples.

21. The far-end cross-talk canceller integrated circuit in claim 16 where the first tentative decision is filtered by a precoder filter first and the filtered output is input to the second FEXT canceller filter of an adjacent receiver.

22. The far-end cross-talk canceller integrated circuit in claim 21 where the precoder filter is an infinite impulse response filter.

23. The far-end cross-talk canceller integrated circuit in claim 16 where the first FEXT canceller filter is a finite impulse response filter.

24. The far-end cross-talk canceller integrated circuit in claim 16 where the second FEXT canceller filter of an adjacent receiver is adapted by a second error signal obtained by computing the difference between the input and output of the second slicer of the second decision device.

25. The far-end cross-talk canceller integrated circuit in claim 16 used in an Ethernet transceiver over copper.

26. The far-end cross-talk canceller integrated circuit in claim 16 used in a 10GBase-T ethernet transceiver.

27. The far-end cross-talk canceller integrated circuit in claim 16 used in a wired transceiver.

28. The far-end cross-talk canceller integrated circuit in claim 16 used in a communications transceiver, where the first received signal corresponds to a signal after echo from the corresponding near-end transmitter has been cancelled from its input signal.

29. The far-end cross-talk canceller integrated circuit in claim 16 used in a communications transceiver, where the first received signal corresponds to a signal after near-end cross-talk from an adjacent transmitter has been cancelled from its input signal.

* * * * *